(12) United States Patent  (10) Patent No.: US 9,154,796 B2
Seregin et al.                 (45) Date of Patent:     Oct. 6, 2015

(54) INTRA-MODE VIDEO CODING

(71) Applicant: Qualcomm Incorporated, San Diego, CA (US)

(72) Inventors: Vadim Seregin, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 396 days.

(21) Appl. No.: 13/666,594

(22) Filed: Nov. 1, 2012

(65) Prior Publication Data

US 2013/0114707 A1    May 9, 2013

Related U.S. Application Data

(60) Provisional application No. 61/556,029, filed on Nov. 4, 2011.

(51) Int. Cl.
    *H04N 7/32*          (2006.01)
    *H04N 19/11*       (2014.01)

(52) U.S. Cl.
    CPC ..................... *H04N 19/11* (2014.11)

(58) Field of Classification Search
    None
    See application file for complete search history.

(56) References Cited

U.S. PATENT DOCUMENTS

| 2011/0243229 | A1 | 10/2011 | Kim et al. |
| 2011/0255591 | A1 | 10/2011 | Kim et al. |
| 2011/0280304 | A1 | 11/2011 | Jeon et al. |
| 2011/0292994 | A1 | 12/2011 | Lim et al. |
| 2012/0082223 | A1 | 4/2012 | Karczewicz et al. |
| 2012/0177112 | A1 | 7/2012 | Guo et al. |
| 2012/0177118 | A1 | 7/2012 | Karczewicz et al. |
| 2012/0307894 | A1 | 12/2012 | Chien et al. |
| 2012/0314766 | A1 | 12/2012 | Chien et al. |

(Continued)

FOREIGN PATENT DOCUMENTS

| EP | 2391130 A2 | 11/2011 |
| GB | 2491391 A | 12/2012 |
| GB | 2494468 A | 3/2013 |

(Continued)

OTHER PUBLICATIONS

Bjoontegaard, et al., "Definition of New Coding Elements from Telenor", VCEG Meeting; May 16-19, 2000; Osaka, JP; (Video Coding Experts Group of ITU-T SG.16), Document No. Q15-J-28, XP030003057, ISSN: 0000-0466 Section 3.4.8 "Coding of Intra prediction modes", 26 pp.

(Continued)

*Primary Examiner* — Dave Czekaj
*Assistant Examiner* — Mohammad J Rahman
(74) *Attorney, Agent, or Firm* — Shumaker & Sieffert, P.A.

(57) ABSTRACT

This disclosure relates to methods and apparatus for encoding and decoding video data. In an example an intra-mode for predicting a current block of video data and most probable intra-modes (MPMs) for predicting the current block of video data may be determined. MPMs for predicting the current block of video data may be determined. An index for each of the MPMs based on an order in which the intra-mode for predicting the current block is compared to the MPMs may be determined. When one of the MPMs for predicting the current block matches the intra-mode for predicting the current block, the index of the matching MPM.

61 Claims, 10 Drawing Sheets

(56) References Cited

U.S. PATENT DOCUMENTS

| | | |
|---|---|---|
| 2013/0022119 A1 | 1/2013 | Chien et al. |
| 2014/0119439 A1 | 5/2014 | Guo et al. |

FOREIGN PATENT DOCUMENTS

| | | |
|---|---|---|
| GB | 2494469 A | 3/2013 |
| JP | 2005184857 A | 7/2005 |
| JP | 2005529527 A | 9/2005 |
| WO | 03105070 A1 | 12/2003 |
| WO | 2010090749 A1 | 8/2010 |
| WO | 2011031332 A1 | 3/2011 |
| WO | 2012171463 A1 | 12/2012 |
| WO | 2013000324 A1 | 1/2013 |
| WO | 2013039676 A1 | 3/2013 |

OTHER PUBLICATIONS

Britanak et al., "Discrete Cosine and Sine Transform: General Properties, Fast Algorithms and Integer Approximations", Academic Press, Apr. 2007, pp. 16-38.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
Bross, et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, JCTVC-K1003_v7, 290 pp.
Chuang, et al., "Luma Intra Prediction Mode Coding", JCT-VC Meeting; MPEG Meeting; Jul. 14-22, 2011; Torino; (Joint Collaborative Team on Video Coding of ISO/IEC JTC1/SC29/WG11 and ITU-T SG. 16 ) ; URL: http://wftp3.itu.int/av-arch/jctvc-site/, , No. JCTVc-F062, XP030009085, 5 pp.
Guo, et al., "CE14 Subtest 1: Intra Most Probable Mode Coding for Luma", Mar. 9, 2011 No. JCTVC-E088, Mar. 9, 2011, XP030008594, ISSN: 0000-0007 Section 2 "Algorithm description"; Section 4 "Conclusion", 3 pp.
International Search Report and Written Opinion—PCT/US2012/063297—ISA/EPO—Apr. 26, 2013, 23 pp.
ITU-T H.265, Series H: Audiovisual and Multimedia Systems, Infrastructure of audiovisual services—Coding of moving video, High efficiency video coding, The International Telecommunication Union, Apr. 2013, 317 pp.
Van Wallendael, et al., "Improved Intra Mode Signaling for HEVC," IEEE International Conference on Multimedia And Expo (ICME), Jul. 11, 2011, XP031964819, DOI: 10.1109/ICME.2011.6012143, ISBN: 978-1-61284-348-3, 6 pp.
Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.
International Preliminary Report on Patentability from International Application No. PCT/US2012/063297, dated Mar. 18, 2014, 16 pp.
Second Written Opinion from International Application No. PCT/US2012/063297, dated Feb. 12, 2014, 18 pp.
Wiegand et al., WD1: Working Draft 1 of High-Efficiency Video Coding, JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.
Bross et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.
Bross et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d21, pp. 290.
Bross et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.
Bross et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, pp. 226.
Bross et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), pp. 214.
ITU-T H.264, Series H: Audiovisual and Multimedia Systems, Infrastructure of audiovisual services—Coding of moving video, Advanced video coding for generic audiovisual services, The International Telecommunication Union. Jun. 2011, pp. 674.
Sarwer et al., "A Novel Bit Rate Reduction Method of H.264/AVC Intra Coding," 3rd International Congress on Image and Signal Processing (CISP2010), IEEE, 2010, pp. 24-28.
Wiegand et al., "WD3: Working Draft 3 of High-Efficiency Video Coding," Document JCTVC-E603, 5th Meeting: Geneva, CH, Mar. 16-23, 2011, pp. 193.
Wiegand et al., "WD2: Working Draft 2 of High-Efficiency Video Coding", Jan. 28, 2011, No. JCTVCD-503, Jan. 28, 2011, XP002679642, Retrieved from the Internet: URL: http://wftp3.itu.int/av-arch/jctvc-site/2011_01_D_Daegu/ [retrieved on Jul. 11, 2012].
Guo et al., "CE14 Subtest 1:The Most Probable Mode Signaling for Luma," Joint Collaborative Team on Video Coding (JCT-VC) of ITU-T SG16 WP3 and ISO/IEC JTC1/SC29/WG11, 5th Meeting: Geneva, Switzerland, Mar. 16-23, 2011, 4 pp.
ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.
First Examination Report from counterpart Australian Patent Application No. 2012332242, dated Mar. 26, 2015, 3 pp.
Response to Written Opinion mailed Apr. 26, 2013, from International Application No. PCT/US2012/063297, dated Sep. 4, 2013, 7 pp.
Response to Second Written Opinion mailed Feb. 12, 2014, from International Application No. PCT/US2012/063297, dated Feb. 26, 2014, 9 pp.
Ding, et al., "Improved Intra Mode Coding by Multiple Mode Candidates", JCT-VC Meeting MPEG Meeting; Jan. 20-28, 2011; Daegu;(Joint Collaborative Team on Video Coding of ISO/IEC JTC1/SC29/WG11AND ITU-T SG.16); URL: http://WFTP3.ITU.INT/AV-ARCH/JCTVC-SITE/, No. JCTVC-D253, XP030008293, 5 pp.
Kanumuri, et al., "Enhancements to Intra Coding", JCT-VC Meeting; MPEG Meeting; Jan. 20-28, 2011; Daegu; (Joint Collaborative Team on Video Coding of ISO/IEC JTC1/SC29/WG11AND ITU-T SG.16); URL: http://WFTP3.ITU.INT/AV-ARCH/JCTVC-SITE/, No. JCTVC-D235, XP030008275, 7 pp.
Taiwan Search Report from counterpart Taiwan Application No. TW101140884, dated May 21, 2015, 1 pp.
Taiwan Office Action from corresponding Taiwanese Application Serial No. 101140884 dated May 25, 2015, 14 pp.
Japanese Office Action from corresponding Japanese Application Serial No. 2014-540129 dated Jun. 9, 2015, 9 pp.
Korean Office Action from corresponding Korean Application Serial No. 2014-7015018 dated Jul. 21, 2015, 16 pp.

INTRA-MODE VIDEO CODING

This application claims the benefit of U.S. Provisional Application No. 61/556,029, filed Nov. 4, 2011, the entire contents of which are incorporated herein by reference.

TECHNICAL FIELD

The disclosure relates to video coding and, more particularly, to methods and apparatus for encoding and decoding video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure relates to techniques for video coding. The techniques of this disclosure generally relate to encoding and decoding video data. In some examples, the techniques relate to sorting of the most probable intra-prediction modes (MPMs). That is, certain aspects of this disclosure relate to avoiding the sorting of MPMs, which may reduce the video coder complexity. Other aspects of this disclosure relate to a default MPM, an order for determining an MPM, and other concepts relating to MPMs.

In one example, the disclosure describes a method of encoding video data. The method includes determining an intra-mode for predicting a current block of video data, determining most probable modes (MPMs) for predicting the current block of video data, determining an index for each of the MPMs based on an order in which the intra-mode for predicting the current block is compared to the MPMs, and signaling, when one of the MPMs for predicting the current block matches the intra-mode for predicting the current block, the index of the matching MPM.

In another example, the disclosure describes an apparatus for encoding video data including one or more processors configured to determine an intra-mode for predicting a current block of video data, determine MPMs for predicting the current block of video data, determine an index for each of the MPMs based on an order in which the intra-mode for predicting the current block is compared to the MPMs, and signal, when one of the MPMs for predicting the current block matches the intra-mode for predicting the current block, the index of the matching MPM.

In another example, the disclosure describes a computer-readable storage medium. The computer-readable storage medium having stored thereon instructions that upon execution cause one or more processors of a device to determine an intra-mode for predicting a current block of video data, determine MPMs for predicting the current block of video data, determine an index for each of the MPMs based on an order in which the intra-mode for predicting the current block is compared to the MPMs, and signal, when one of the MPMs for predicting the current block matches the intra-mode for predicting the current block, the index of the matching MPM.

In another example, the disclosure describes an apparatus for encoding video data including means for determining an intra-mode for predicting a current block of video data, means for determining MPMs for predicting the current block of video data, means for determining an index for each of the MPMs based on an order in which the intra-mode for predicting the current block is compared to the MPMs, and means for signaling, when one of the MPMs for predicting the current block matches the intra-mode for predicting the current block, the index of the matching MPM.

In another example, the disclosure describes a method of decoding video data, the method including generating, when an intra-mode for a current block comprises an MPM, a list of MPMs for a current block of video data, wherein the list of MPMs is arranged in an order in which the intra-mode for the current block of video data is compared to one or more intra-modes associated with one or more reference blocks of video data, determining an MPM index that identifies the intra-mode for the current block in the list of MPMs, identifying the intra-mode for the current block using the MPM index, and decoding the current block with the identified intra-mode for the current block.

In another example, the disclosure describes an apparatus including one or more processors configured to, when an intra-mode for a current block comprises an MPM generate a list of MPMs for a current block of video data, wherein the list of MPMs is arranged in an order in which the intra-mode for the current block of video data is compared to one or more intra-modes associated with one or more reference blocks of video data, determine an MPM index that identifies the intra-mode for the current block in the list of MPMs, identify the intra-mode for the current block using the MPM index, and decode the current block with the identified intra-mode for the current block.

In another example, the disclosure describes a computer-readable storage medium. The computer-readable storage medium having stored thereon instructions that upon execution cause one or more processors of a device to generate, when an intra-mode for a current block comprises an MPM, a list of MPMs for a current block of video data, wherein the list of MPMs is arranged in an order in which the intra-mode for the current block of video data is compared to one or more intra-modes associated with one or more reference blocks of video data, determine an MPM index that identifies the intra-mode for the current block in the list of MPMs, identify the intra-mode for the current block using the MPM index, and decode the current block with the identified intra-mode for the current block.

In another example, the disclosure describes an apparatus for decoding video data, the apparatus including means for generating, when an intra-mode for a current block comprises an MPM, a list of MPMs for a current block of video data, wherein the list of MPMs is arranged in an order in which the intra-mode for the current block of video data is compared to one or more intra-modes associated with one or more reference blocks of video data, means for determining an MPM index that identifies the intra-mode for the current block in the list of MPMs, means for identifying the intra-mode for the current block using the MPM index, and means for decoding the current block with the identified intra-mode for the current block.

The details of one or more examples of the disclosure are set forth in the accompanying drawings and the description below. Other features, objects, and advantages will be apparent from the description and drawings, and from the claims.

DETAILED DESCRIPTION

Figure 1:
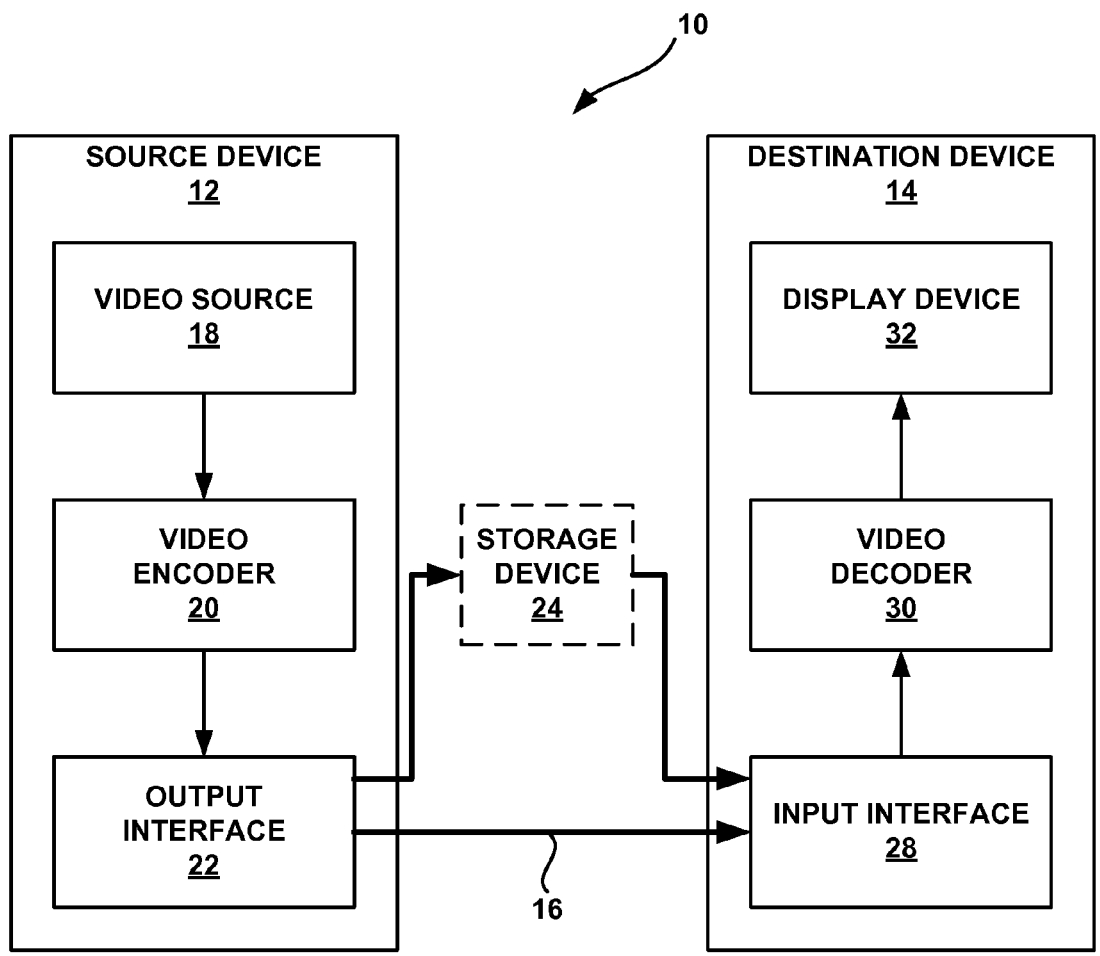
FIG. 1 is a block diagram illustrating an example video encoding and decoding system that may utilize the techniques described in this disclosure.

In an example, aspects of this disclosure are directed to the sorting of most probable intra-prediction modes (MPMs). For example, according to some video coding techniques, a video coder (e.g., a video encoder or video decoder) may sort MPMs prior to determining and signaling an MPM for a block currently being coded. Aspects of this disclosure relate to removing such sorting, which may reduce the video coder complexity.

In an example, a video encoder may generate a list of MPMs that includes intra-prediction modes from a set of MPMs in an order in which the MPMs appear in a picture or slice of video data (e.g., a coding order). In another example, the video encoder may generate a list of MPMs in an order in which the video encoder checks whether an intra-mode of a neighboring block is the same as the block currently being coded (referred to herein as a "checking order"). The video encoder may signal an MPM according to an index to the generated list, and without sorting or reordering the MPMs in the list. A video decoder may perform the same process to generate the list of MPMs, obtain an index to the list from an encoded bitstream, and select an MPM from the list according to the index without sorting or reordering the MPMs in the list.

In an example for purposes of illustration, a video coder may first check whether an intra-mode of a block positioned to the left of a block currently being coded (referred to herein as a "left-neighboring block") is the same as the intra-mode of the current block. The video coder may then check whether an intra-mode of a block positioned above the block currently being coded (referred to herein as an "above-neighboring block") is the same as the intra-mode of the current block. In this example, according to aspects of this disclosure, the intra-mode of the left-neighboring block may have a zero index in a list of MPMs maintained by the video coder, and the intra-mode of the above-neighboring block may have an index of one in the list. Accordingly, a video encoder may signal the index of the intra-mode of the left-neighboring block as zero and the index of the above-neighboring block as one, regardless of whether an actual intra-mode number (e.g., a predefined mode number, as designated by a video coding standard) of the left-neighboring block is greater than the above-neighboring block. Alternatively, if the video coder checks the intra-mode of the above-neighboring block before the left-neighboring block, the video coder may signal the index of the above-neighboring block as zero and the index of the left-neighboring block as one. In any event, according to these examples and aspects of this disclosure, the video encoder may signal the index for the intra-mode without reordering or sorting the intra-modes in the list. In some examples, sorting may be applied for intra-mode coding if the intra-mode is not one of the MPMs. That is, a video encoder may sort or otherwise modify a list of intra-modes when signaling an intra-mode that is not a MPM. According to aspects of this disclosure, the order in which a video coder checks the intra-mode of neighboring blocks (referred to herein as "checking order") may be intra-mode implicitly derived according to collected statistics of the intra-modes of previously coded blocks. In other examples, the video coder may derive a checking order based on the availability of the neighboring blocks. In still other examples, a video encoder may signal (and a video decoder may obtain from an encoded bitstream) an explicit indication of the checking order.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 24. Similarly, encoded data may be accessed from storage device 24 by input interface. Storage device 24 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 24 may correspond to a file server or another intermediate storage device that may hold the encoded video generated by source device 12. Destination device 14 may access stored video data from storage device 24 via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 24 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 24 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 24, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage medium 34 or file server 36) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

The JCT-VC is working on development of the HEVC standard. The HEVC standardization efforts are based on an evolving model of a video coding device referred to as the HEVC Test Model (HM). The latest Working Draft (WD) of HEVC, and referred to as HEVC WD7 hereinafter, is available from http://phenix.int-evey.fr/jct/doc_end_user/documents/9_Geneva/wg11/JCTVC-I1003-v5.zip, with a more recent version available from http://phenix.int-evey.fr/jct/doc_end_user/documents/9_Geneva/wg11/JCTVC-I1003-v6.zip, both of which are hereby incorporated by reference as if set forth in their entirety herein. The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, un-split child node, as a leaf node of the quadtree, comprises a coding node, e.g., a coded video block. Syntax data associated with a coded bitstream may define a maximum number of times a treeblock may be split, and may also define a minimum size of the coding nodes.

A coding unit (CU) includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A transform unit (TU) can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, e.g., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the un-encoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in variable-length coding (VLC) may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In some examples, video encoder 20 and/or video decoder 30 may identify a so called "most probable" intra-prediction mode during intra-prediction coding. That is, for example, video encoder 20 and/or video decoder 30 may identify an intra-prediction mode of previously coded blocks that neighbor a block currently being coded (referred to as "reference blocks") and compare such intra-prediction modes to an intra-prediction mode for the block currently being coded (referred to as "the current block"). The intra-modes of such reference blocks may have a relatively high probability of being the same or similar to the current block due to a spatial proximity of the neighboring blocks to the current block. As described in greater detail below, the intra-prediction mode of multiple reference blocks may be considered when identifying an MPM.

In addition, according to some examples, video encoder 20 and/or video decoder 30 may signal an index that identifies the MPM. That is, each intra-mode may have an associated (original) intra-mode index that identifies the intra-mode as one of a plurality of possible intra-modes, as defined according to a coding standard. For example, the proposed HEVC standard may support up to 35 intra-modes, with each intra-mode being assigned an index value (e.g. an index value to a look up table) that can be used to identify the intra-modes.

According to some video coding standards, video encoder 20 and/or video decoder 30 may sort the MPMs according to the original intra-mode index values. Video encoder 20 and/or video decoder 30 may then assign a new index value of "0" to the intra-mode having the smaller original intra-mode index (e.g., the lower original index value), an index value of "1" to the intra-mode having the next larger original intra-mode index value (e.g., the higher original intra-mode index value), and so on. In this way, video encoder 20 may signal (and video decoder 30 may retrieve from an encoded bitstream) the MPM using fewer bits than sending the actual intra-mode index. However, despite gains achieved by indicating an intra-mode using the MPM, the intra-mode sorting may add computational complexity to the coding process.

According to aspects of this disclosure, rather than sorting the MPMs based on the index values of the MPMs, video encoder 20 and/or video decoder 30 may generate a list of the MPMs that does not require sorting. That is, for example, video encoder 20 and/or video decoder 30 may assign index values to the MPMs in an order in which the MPMs are compared to the intra-mode of the current block. In other examples, video encoder 20 and/or video decoder 30 may assign index values according to an order in which the MPMs are coded. In this way, if the intra-mode being coded is equal to one of the MPMs, the MPMs do not need to be sorted according to their original intra-mode index value and video coder complexity can be reduced. In some examples, intra-mode sorting may be applied to code the intra-mode if the intra-mode is not equal to one of the MPMs.

In some examples, video encoder 20 determines an intra-mode for predicting a current block of video data, determines MPMs for predicting the current block of video data, compares the intra-mode to each of the MPMs in a comparison order, determines an index for each of the MPMs based on the comparison order, and signals the index of the MPM that matches the intra-mode for predicting the current block of data in a bitstream.

Additionally, in an example, the video encoder 20 may signal a generated list of the MPMs in the comparison order. The video encoder 20 may also determine an index for each of the MPMs comprises assigning index values to each of the MPMs in the list in ascending order. In another example, the video encoder 20 may signal an MPM flag prior to the index of the MPM to indicate that the index of the MPM has been signaled.

The MPMs may be associated with a left-neighboring video block of the current block and an above-neighboring video block of the current block, and the comparison order may comprise comparing an intra-mode associated with the left-neighboring video block prior to comparing the above-neighboring block. The MPMs may be associated with a left-neighboring video block of the current block and an above-neighboring video block of the current block, and the comparison order may comprise comparing an intra-mode associated with the above-neighboring block prior to comparing an intra-mode associated with the left-neighboring video block.

In another example, video decoder 30 may generate a list of MPMs for a current block of video data. The list of MPMs may then be arranged in a comparison order. This comparison order may be indicative of an order in which an intra-mode for a current block of video data is compared to one or more intra-modes associated with one or more reference blocks of video data during encoding of the current block of video data. Video decoder 30 may determine an MPM index that identifies the intra-mode for the current block in the list of MPMs. Video decoder 30 may then identify the intra-mode for the current block using the MPM index, and decode the current block with the identified intra-mode for the current block.

In an example, more than two reference blocks include one or more blocks that are positioned above the current block and neighbor the current block. The more than two reference blocks may include one or more blocks that are positioned to the left of the current video block and neighbor the current block. In an example, the list of MPMs may be arranged in a comparison order that is indicative of an order in which an intra-mode for a current block of video data is compared to one or more intra-modes associated with one or more reference blocks of video data during encoding of the current block of video data.

In another example, the MPMs may be associated with a left-neighboring video block of the current block and an above-neighboring video block of the current block, and the comparison order may include comparing an intra-mode associated with the left-neighboring block prior to comparing the intra-mode associated with the above-neighboring block. In a further example, the MPMs may be associated with a left-neighboring video block of the current block and an above-neighboring video block of the current block, and the comparison order comprises comparing an intra-mode associated with the above-neighboring block prior to comparing an intra-mode associated with the left-neighboring video block.

Certain aspects of this disclosure relate to assigning a default mode in instances in which either block A or block B is not available for intra-mode coding. For example, a video coder such as video encoder 20 or video decoder 30 may identify a current block of video data. The coder may make a determination as to whether the block is not available to be used as reference blocks for determining an MPM for the current block of video data. The video coder may assign a default intra-mode to any block that is not available to be used as a reference block. In some examples, the default intra-mode may be planar mode, DC mode, etc. The coder may determine an intra-mode for the current block of video data based on the intra-modes of one or more blocks of video data. Additionally, the coder may code the current block using the determined intra-mode.

Figure 2:
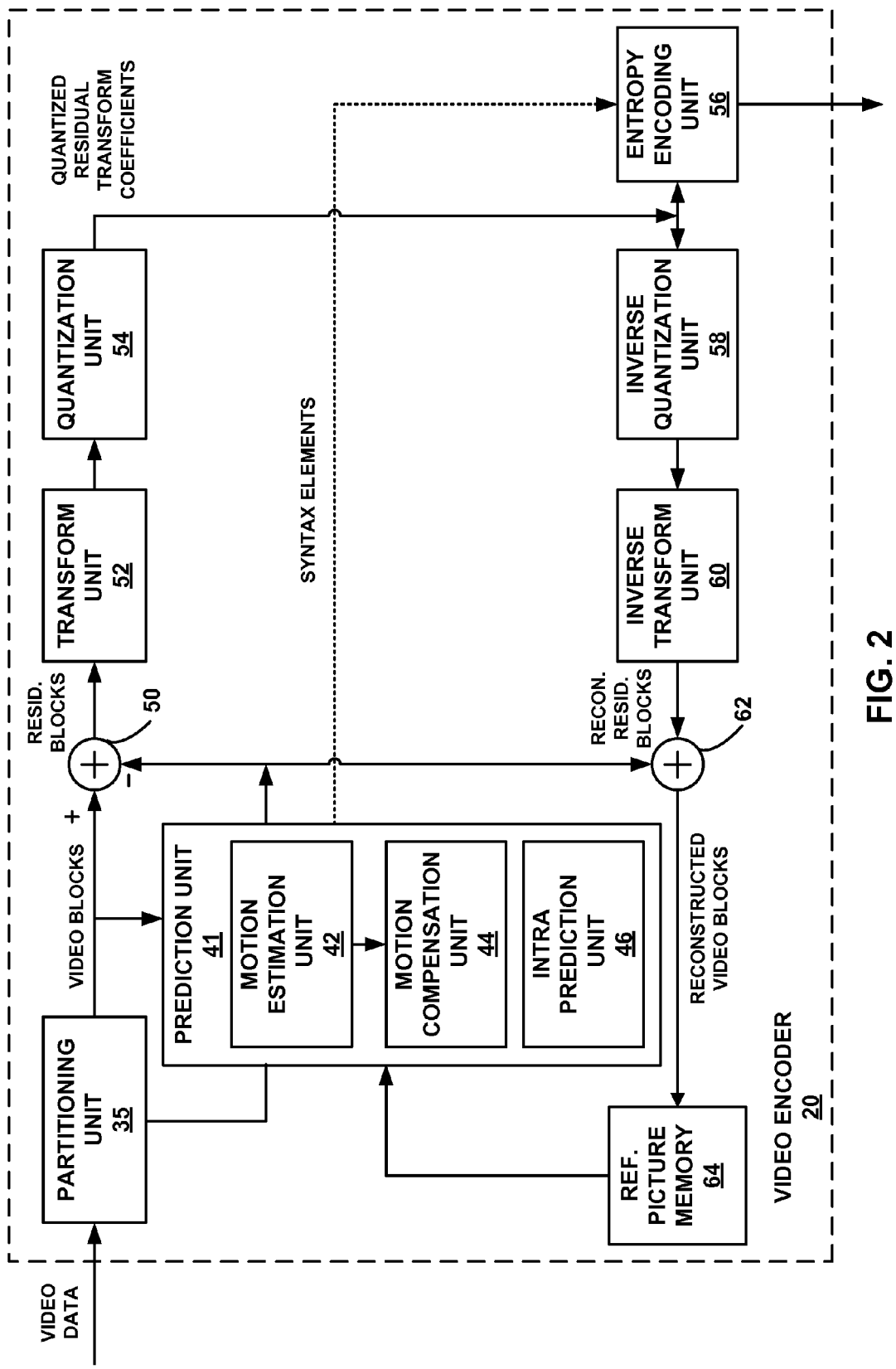
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction unit 41, reference picture memory 64, summer 50, transform processing unit 52, quantization unit 54, and entropy encoding unit 56. Prediction unit 41 includes motion estimation unit 42, motion compensation unit 44, and intra prediction unit 46. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. In general, a slice may be divided into multiple video blocks (and possibly into sets of video blocks referred to as tiles). Prediction unit 41 may select one of a plurality of possible coding modes, such as one of a plurality of intra coding modes or one of a plurality of inter coding modes, for the current video block based on error results (e.g., coding rate and the level of distortion). Prediction unit 41 may provide the resulting intra- or inter-coded block to summer 50 to generate residual block data and to summer 62 to reconstruct the encoded block for use as a reference picture.

Motion estimation unit 42 and motion compensation unit 44 within prediction unit 41 perform inter-predictive coding of the current video block relative to one or more predictive blocks in one or more reference pictures to provide temporal compression. Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra prediction unit 46 within prediction unit 41 may perform intra-predictive coding of the current video block relative to one or more neighboring blocks in the same picture or slice as the current block to be coded to provide spatial compression. Accordingly, intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block. According to the proposed HEVC standard, there may be up to 35 intra-prediction modes, and each intra-prediction mode may be associated with an index.

Aspects of this disclosure generally relate to intra-coding. As such, certain techniques of this disclosure may be performed by intra-prediction unit 46. That is, for example, intra-prediction unit 46 may perform the techniques of this disclosure described with respect to FIGS. 4-10 below. In other examples, one or more other units of video encoder 20 may additionally or alternatively be responsible for performing the techniques of this disclosure.

For example, intra-prediction unit 46 may determine an intra-mode for a block currently being encoded (e.g., according to a rate-distortion analysis, as described above). Intra-prediction unit 46 may also determine an intra-prediction mode of one or more previously coded blocks (referred to as MPMs) that neighbor the block currently being intra-coded. Intra-prediction unit 46 may indicate the determined intra-mode for the current block based on the determined intra-modes of the neighboring blocks, e.g., by comparing the MPMs to the intra-mode for the current block, as described in greater detail below.

According to aspects of this disclosure, intra-prediction unit 46 may generate a list of the MPMs in the order in which the MPMs are compared to the intra-mode of the current block. Intra-prediction unit 46 may then assign index values to the MPMs in an order in which the MPMs are compared to the intra-mode of the current block. In this way, intra-prediction unit 46 may indicate a particular MPM without sorting MPMs according to their original intra-mode index value (e.g., according to a video coding standard).

After prediction unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Entropy encoding unit 56 may also entropy encode the motion vectors and the other syntax elements for the current video slice being coded. Following the entropy encoding by entropy encoding unit 56, the encoded bitstream may be transmitted to video decoder 30, or archived for later transmission or retrieval by video decoder 30.

Entropy coding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of an MPM, an intra-prediction mode index table, and a modified intra-prediction mode index table to use for each of the contexts.

Inverse quantization unit 58 and inverse transform unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

Figure 3:
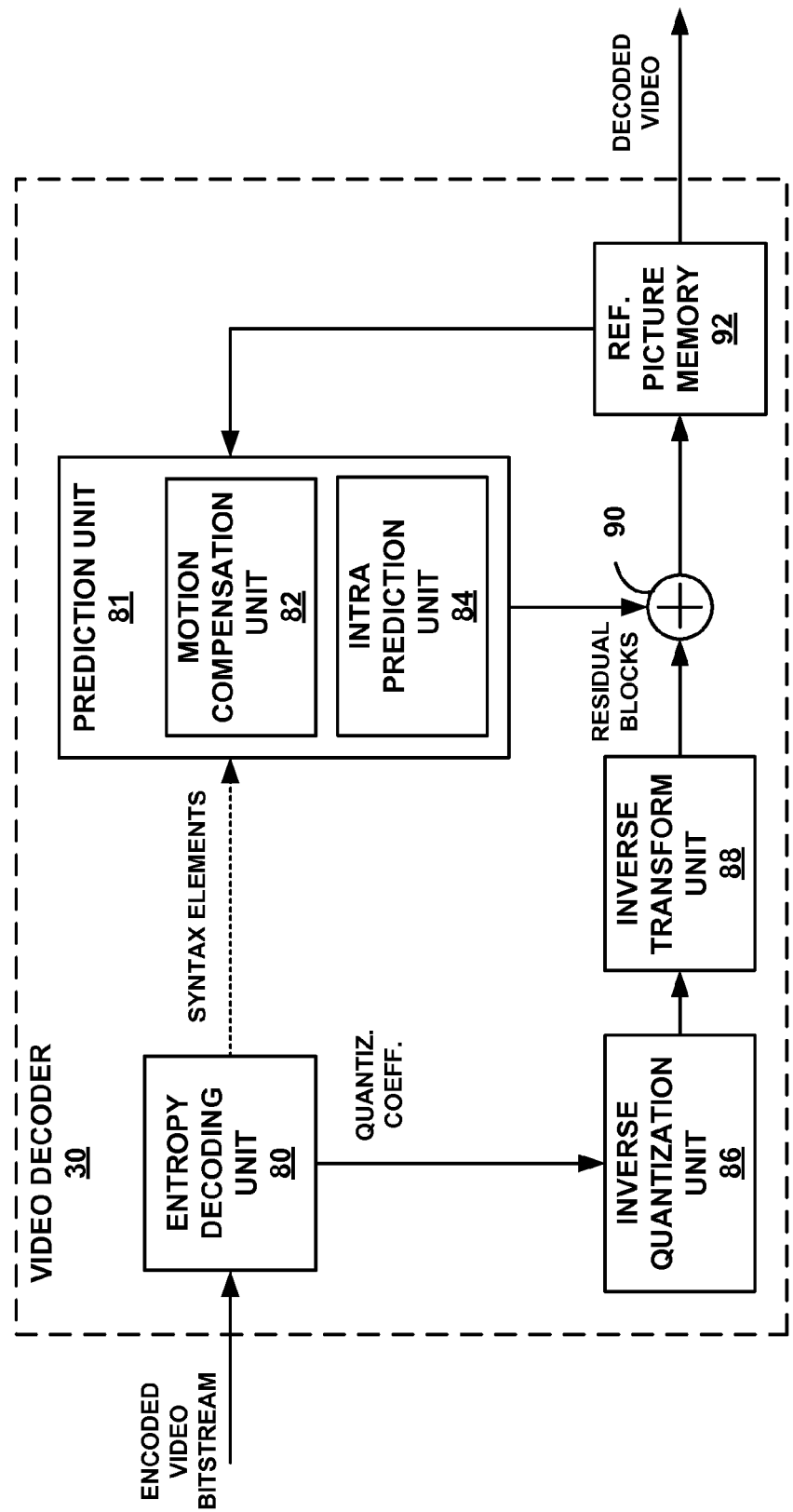
FIG. 3 is a block diagram illustrating an example video decoder that may implement the techniques described in this disclosure.

FIG. 3 is a block diagram illustrating an example video decoder 30 that may implement the techniques described in this disclosure. In the example of FIG. 3, video decoder 30 includes an entropy decoding unit 80, prediction unit 81, inverse quantization unit 86, inverse transformation unit 88, summer 90, and reference picture memory 92. Prediction unit 81 includes motion compensation unit 82 and intra-prediction unit 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction unit 81. Video decoder 30 may receive the syntax elements at the video slice level and/or the video block level.

When the video slice is coded as an intra-coded (I) slice, intra prediction unit 84 of prediction unit 81 may generate prediction data for a video block of the current video slice based on a signaled intra prediction mode and data from previously decoded blocks of the current frame or picture.

As noted above, aspects of this disclosure generally relate to intra-coding. As such, certain techniques of this disclosure may be performed by intra-prediction unit 84. That is, for example, intra-prediction unit 84 may perform the techniques of this disclosure described with respect to FIGS. 4-7 below. In other examples, one or more other units of video decoder 30 may additionally or alternatively be responsible for performing the techniques of this disclosure.

For example, intra-prediction unit 84 may obtain an index to a list of MPMs for decoding a current block of video data from entropy decoding unit 80. Intra-prediction unit 84 may generate the list to which the index belongs by including MPMs in the list in the same manner as video encoder 20, e.g., the order in which the MPMs are compared to the intra-mode of the current block. Intra-prediction unit 84 may then determine the appropriate intra-mode for decoding the current block of video data based on the obtained index. In this way, intra-prediction unit 84 may determine the appropriate MPM for decoding the current block without sorting MPMs according to their original intra-mode index value (e.g., according to a video coding standard).

When the video picture is coded as an inter-coded (e.g., B, P or GPB) slice, motion compensation unit 82 of prediction unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference picture lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, e.g., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

As noted above, the techniques of this disclosure generally relate to intra-coding. It should be understood that the techniques of this disclosure may be carried out by any of the video coders described in this disclosure, including, for example, video encoder 20 and video decoder 30 as shown and described with respect to FIGS. 1-3. That is, in an example, intra-prediction unit 46 described with respect to FIG. 2 may perform certain techniques described below when performing intra-prediction during encoding of a block of video data. In another example, intra-prediction unit 84 described with respect to FIG. 3 may perform certain techniques described below when performing intra-prediction during decoding of a block of video data. Accordingly, references to a generic "video coder" may include video encoder 20, video decoder 30, or another video encoding or decoding unit.

In some examples, a video coder may identify a so called "most probable" intra-prediction mode during intra-prediction coding. That is, for example, a video encoder (e.g., such as video encoder 20) may identify an intra-prediction mode of previously encoded blocks (e.g., reference blocks) and compare such intra-prediction modes to an intra-prediction mode for the current block. The intra-modes of such reference blocks may have a relatively high probability of being the same or similar to the current block due to a spatial proximity of the blocks to the current block. As described in greater detail below, the intra-prediction mode of multiple reference blocks may be considered when identifying an MPM.

If the intra-prediction mode for the current block is the same as the MPM, video encoder 20 may signal the intra-prediction mode using a one bit MPM flag. That is, video encoder 20 can signal that the intra-prediction mode for a current block is the same as the MPM, without having to explicitly identify the intra-prediction mode for the current block. Video decoder 30 may receive the flag indicating that the intra-mode for the current block is the same as the MPM, and repeat the process used by video encoder 20 to determine that MPM. That is, video decoder 30 may identify the MPM using the same blocks considered by video encoder 20 during encoding.

Figure 4:
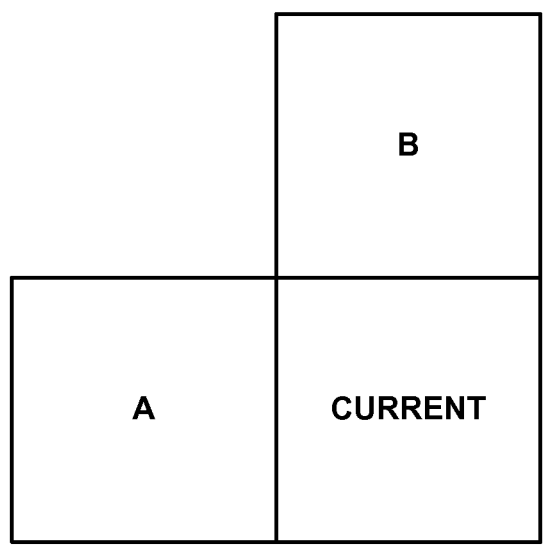
FIG. 4 is a block diagram illustrating blocks of video data that may be considered during intra-mode prediction.

FIG. 4 shows an example of a current block, e.g., coding unit, ("current CU") and two reference blocks (e.g., "A" and "B") that may be considered during intra-coding. For example, a video encoder (e.g., such as video encoder 20), may consider the intra-modes associated with reference block A (positioned to the left of the current block) and reference block B (positioned above the current block) as the MPMs of the current block. In some examples, if either of the MPM candidates (e.g., block A or block B) does not use intra-mode, or is otherwise unavailable (e.g., the block has not yet been coded), video encoder 20 may assign a default intra-mode to the block, such as DC mode. Also, in some examples, the number of MPMs may be greater than two. For example, video encoder 20 may generate additional MPMs based on intra-modes of more than two reference blocks.

If the actual intra-mode for the current block (e.g., as calculated, for example, by intra-prediction unit 46) is the same as either reference block A or reference block B, video encoder 20 may signal a one-bit flag indicating that an MPM is used to encode the current block (e.g., MPM flag is set equal to one).

In addition, according to some examples, video encoder 20 may signal an index that identifies the MPM. That is, each intra-mode may have an associated (original) intra-mode index that identifies the intra-mode as one of a plurality of possible intra-modes, as defined according to a coding standard. For example, the proposed HEVC standard may support up to 35 intra-modes, with each intra-mode being assigned an original, standard specified index value as shown in Table 1 below:

TABLE 1

INTRA PREDICTION MODES AND INDEX NUMBERS

| Intra prediction mode | Associated names |
|---|---|
| 0 | Intra_Planar |
| 1 | Intra_DC |
| (2-34) | Intra_Angular |

In the example of Table 1, planar intra-mode has an original index value of 0, DC intra-mode has an original index value of 1, and the various angular intra-modes have original index values between 2 and 34.

Traditionally, when intra-coding a current block based on MPM, video encoder 20 sorts the MPMs according to the original intra-mode index values. In an example with two MPMs, video encoder 20 may then assigns a new index value of "0" to the intra-mode having the smaller original intra-mode index (e.g., the lower original index value). In addition, video encoder 20 assigns a new index value of "1" to the intra-mode having the larger original intra-mode index value (e.g., the higher original intra-mode index value). In this way, video encoder 20 may signal the MPM using fewer bits than sending the actual intra-mode index. In some examples, if the intra-mode of reference block A is the same as the intra-mode of reference block B, video encoder 20 does not send an additional index value. In some examples, if the number of MPMs is greater than two, similar index assignments may be made.

If the intra-mode of the current block is not equal to the MPM, video encoder 20 may intra-code the current block, for example, using a fixed-length coding table, or other method.

A video decoder, such as video decoder 30, may receive the MPM flag and the MPM index. Video decoder 30 may then perform a similar process as described with respect to video encoder 20 to determine to which intra-mode that the MPM index refers. That is, video decoder 30 may sort the intra-modes in ascending original index order. Video decoder 30 may assign an index value of "0" to the smaller original intra-mode index and an index value of "1" to the larger original intra-mode index. Video decoder 30 may then use the signaled MPM index to select one of the sorted intra-modes. Video decoder 30 may then decode the intra-coded block of video data.

According to some video coding techniques, a video coder (e.g., a video encoder or video decoder) may sort MPMs prior to determining and signaling an MPM for a block currently being coded. This can increase video coder complexity. As described in greater detail below, certain aspects of this disclosure relate to removing the sorting of MPMs to reduce video coder complexity. For example, video encoder 20, video decoder 30, or both may generate a list of the MPMs that does not require sorting. The video encoder 20 and/or video decoder 30 may assign index values to the MPMs in an order in which the MPMs are compared to the intra-mode of the current block. In other examples, video encoder 20 and/or video decoder 30 may assign index values according to an order in which the MPMs are coded. In this way, the MPMs do not need to be sorted according to their original intra-mode index value, and video coder complexity can be reduced.

In addition, certain aspects of this disclosure also relate to assigning a default mode in instances in which either block A or block B is not available for intra-mode coding. For example, video encoder 20 may assign a preselected mode such as planar mode or DC mode as the default mode.

Figure 5:
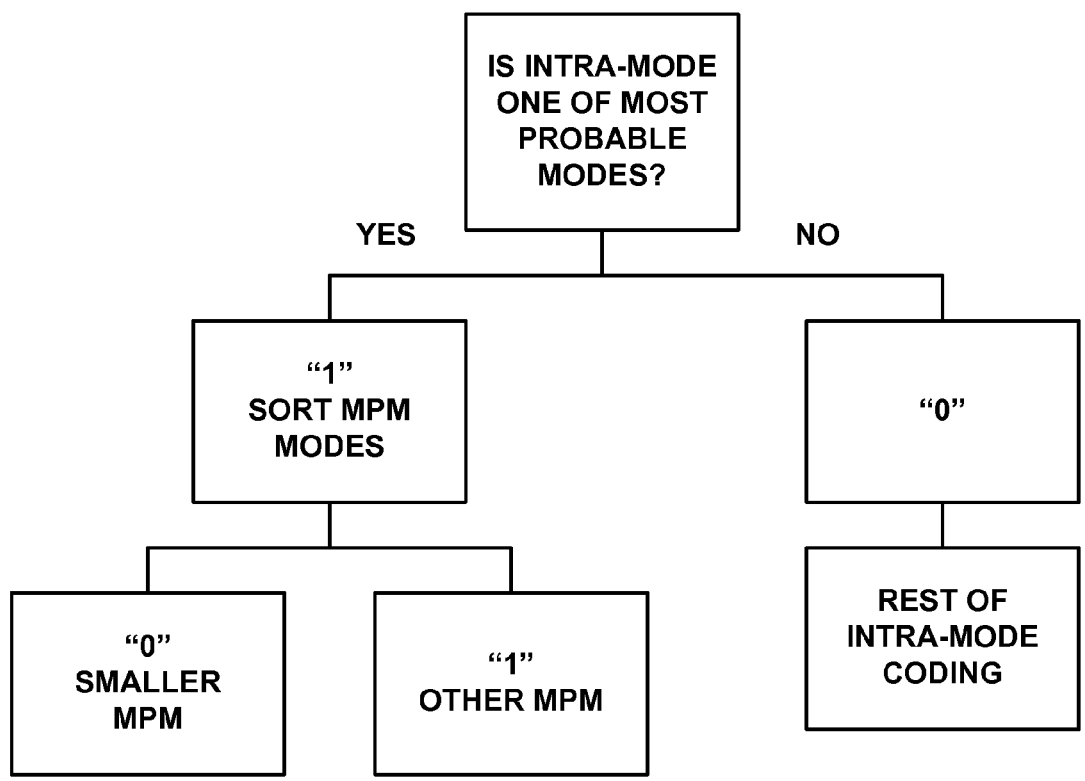
FIG. 5 is a conceptual diagram illustrating intra-mode prediction.

FIG. 5 is a conceptual diagram of intra-mode coding, as described above with respect to FIG. 4. For example, as shown in the example of FIG. 5, if the intra-mode of the current block matches one of the MPMs (e.g., the "yes" branch), video encoder 20 may set an MPM flag equal to one ("1"). In addition, video encoder 20 may sort the MPMs according to their original index value ("SORT MPM MODES"). That is, video encoder 20 assigns the MPM having the smaller original intra-mode index a value of zero ("0" "SMALLER MPM") and assigns the MPM having the larger original intra-mode index a value of one ("1" "OTHER MPM"). Video encoder 20 may then signal the intra-mode for the current block based on the MPM. That is, video encoder 20 may send the "1" flag to indicate that an MPM is used, and either the "0" flag or the "1" flag to identify the appropriate MPM.

If the intra-mode of the current block does not match one of the MPMs (e.g., the "no" branch), video encoder 20 may set an MPM flag to zero ("0"). In addition, video encoder 20 may code the intra-mode, for example, using a fixed length table or other method ("REST OF INTRA-MODE CODING").

Figure 6:
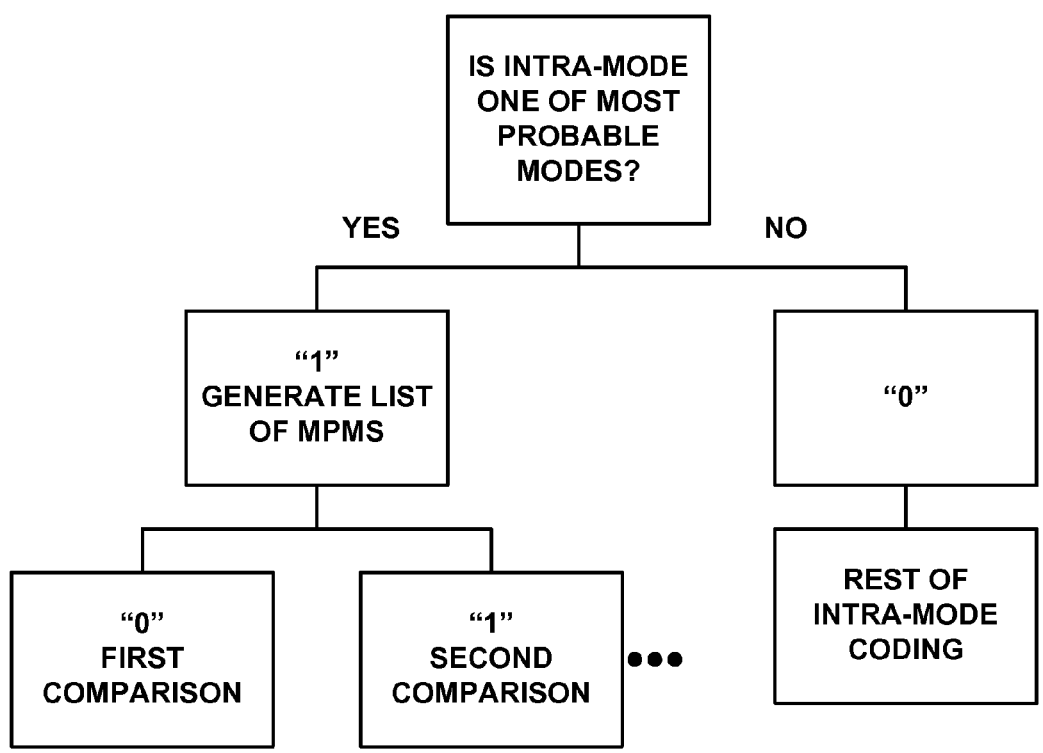
FIG. 6 is another conceptual diagram illustrating intra-mode prediction.

FIG. 6 is a conceptual diagram of intra-mode coding, according to aspects of this disclosure. For example, as shown in the example of FIG. 6, if the intra-mode of the current block matches one of the MPMs (e.g., the "yes" branch), video encoder 20 may set an MPM flag equal to one ("1"). According to aspects of this disclosure, rather than sorting the MPMs based on the index values of the MPMs, video encoder 20 may generate a list of the MPMs that does not require sorting ("GENERATE LIST OF MPMS"). That is, for example, certain techniques of this disclosure relate to assigning index values to the MPMs in an order in which the MPMs are compared to the intra-mode of the current block. In this way, the MPMs do not need to be sorted according to their original intra-mode index value. If the intra-mode of the current block is not one of the MPMs, video encoder 20 may set an MPM flag equal to zero ("0") and additional MPMs sorting may be applied before performing the rest of intra-mode coding. That is, for example, video encoder 20 may sort a listing of remaining intra-modes (that does not include the MPMs) prior to identifying on of the intra-modes in the list for the current block.

In an example for purposes of explanation, video encoder 20 may compare the intra-mode associated with a current block of video data to the intra-modes associated with one or more reference blocks, such as the intra-modes of one or more neighboring blocks (e.g., blocks that spatially neighbor the current block), to determine one of the MPMs matches the actual intra-mode for the current block. As noted above with respect to FIGS. 4 and 5, video encoder 20 may compare the intra-mode of the current block to two neighboring blocks, although the intra-modes of more or fewer reference blocks may be considered (e.g., one, three, five, and the like), additionally, MPMs may be generated based on neighboring intra-modes According to aspects of this disclosure, video encoder 20 may assign an index value to the MPMs in the order in which the MPMs are compared to the current intra-mode. In an example with two MPMs video encoder 20 may first compare the intra-mode of the current block to the intra-mode of the left-neighboring block, followed by comparing the intra-mode of the current block to the intra-mode of the above-neighboring block (see, for example, the arrangement shown in FIG. 4). Accordingly, video encoder 20 may assign an index value of zero to the intra-mode of the left-neighboring block ("0" "FIRST COMPARISON") and an index value of one to the intra-mode of the above-neighboring block ("1" "SECOND COMPARISON"). While the example shown in FIG. 6 includes only two MPMs, additional index values may be assigned to other MPMs if such MPMs are considered.

If the intra-mode of the current block does not match one of the MPMs (e.g., the "no" branch), video encoder 20 may set an MPM flag to zero ("0"). In addition, video encoder 20 may code the intra-mode, for example, using a fixed length table or other method ("REST OF INTRA-MODE CODING"). Additionally, in some examples and as noted above, video encoder 20 may sort the remaining intra-modes according to an MPM sorting process.

Assume, for purposes of explanation, that 35 intra-modes are available for intra-coding a block of video data. Assume further that the 35 intra-modes may be identified by a mode number, which may be included in a table identifying available intra-modes. In an example in which the current mode is not an MPM, with e.g., MPMs that are 15, 2, and 31 and with a current mode that is 16, a video coder (e.g., video decoder 30 or video encoder 20) may initially sort the MPMs into ascending order. Accordingly, the list of MPMs 15, 2, and 31, becomes 2, 15, and 31 after sorting. Second, the video coder may eliminate the MPMs from the remaining intra-modes, because it is known that the current mode is not an MPM. The remaining 32 modes may then be remapped to 32 5-bit codewords. Some examples may use a table of the remaining 32 modes, eliminating modes 2, 15, 31. Other examples, however, do not use a table.

With respect to mapping, for example, because the current mode (e.g. mode 16) is greater than or equal to the first of the sorted MPMs (mode 2), the video coder may subtract 1 from the current mode (16−1=15). The value after the first subtraction (15) is also greater than or equal to the second of the sorted MPMs (15), so the video coder subtracts 1 again (15−1=14). The value after the second subtraction (14) is less than 31, so the video coder does not perform another subtraction. Accordingly, the current mode maps to the fourteenth entry in the new table as calculated by performing the two subtractions on current mode 16 (16−2=14). In other examples, modes may be mapped in different manners.

In another example in which the current mode is not and MPM, with e.g., MPMs that are 5, 4, and 6 and a current mode that is 15, the video coder may sort the MPMs into ascending order. Accordingly, 5, 4, 6, becomes 4, 5, 6. The video coder may then make a list or table of the remaining 32 modes, eliminating modes 4, 5, and 6. As discussed above, it should be understood that not all examples use a table.

In the examples above, it is assumed that the current mode is not an MPM. In contrast, for a case when the current mode is an MPM, e.g. MPMs that are 5, 4, and 6 and a current mode that is 4, the video coder may set an MPM flag equal to "1." In addition, the video coder may set an index for the MPMs equal to "1." For example, the index may map the MPMs based on the ordering in the list. That is, in the example above, the video coder may map 5 to an index of 0, 4 to an index of 1, 6 to an index of 2.

In some examples, as noted above, video encoder 20 may generate a list of the MPMs in the order in which the MPMs are compared to the intra-mode of the current block. Thus, the index may identify the matching MPM based on the comparison order. Video encoder 20 may then assign index values to each of the MPMs in the list. For example, video encoder 20 may assign index values to each of the MPMs in the list in ascending order, such that the first MPM that is compared to the current intra-mode has the lowest relative index value, and the last MPM that is compared to the current intra-mode has the highest relative index value. In contrast, each intra-mode may have an original associated intra-mode index that identifies the intra-mode as one of a plurality of possible intra-modes (such as one of 35 intra-modes), as defined according to a coding standard. This original index may be different from the index signaled in the bitstream according to the aspects of this disclosure.

Video encoder 20 may then signal the MPM flag and MPM index to a video decoder, such as video decoder 30. Video decoder 30 may perform a similar process as described with respect to video encoder 20 to identify the appropriate intra-mode from the received index value. That is, for example, video decoder 30 may generate a list that includes the MPMs in the order in which the intra-modes were compared to the current intra-mode. Video decoder 30 may then apply index values to each of the MPMs, and select the appropriate intra-mode for the current block using the received index value.

In some examples, the order in which the MPMs are compared to the current intra-mode can be implicitly derived according to collected statistics of previously coded intra-modes. That is, for example, if an intra-mode associated with a certain reference block more frequently matches the current intra-mode than other MPMs of other blocks, the intra-mode associated with the certain reference block may be compared earlier than the other MPMs of the other blocks.

In other examples, the comparison order may be derived based on availability, or may be explicitly signaled. For example, if one or more reference blocks containing MPMs are frequently unavailable, such reference blocks may be compared to the current block relatively later than the more commonly available reference blocks. In other examples, video encoder 20 may determine and explicitly signal a particular comparison order in an encoded bitstream.

Eliminating the sorting step (e.g., sorting the MPMs according to their index values) may reduce the complexity of the coding process. That is, rather than having to explicitly sort the MPMs, the video coder may generate a list of the MPMs while determining whether the current intra-mode is the same as any of the MPMs. In this way, certain techniques of this disclosure may be used to increase computational efficiency of a video coder. However, in some examples, MPM sorting may be preserved for intra-mode coding if the intra-mode is not equal to one of the MPMs. For example, when an intra-mode does not match one of the MPMs the remaining modes may be sorted.

The techniques of this disclosure also relate to assigning a default intra-mode to blocks of video data that are not available to be considered as reference blocks during MPM coding. That is, for example, a reference block may be considered "unavailable" if the reference block has not yet been coded (and thus its prediction mode is unknown), if the reference block is coded using inter-prediction (described above), or if the reference block does not exist (the block positioned in the upper left corner of a picture or slice may not have neighboring blocks to the left and/or above).

According to aspects of this disclosure, upon identifying blocks that cannot be used for reference during intra-coding (e.g., during the MPM derivation process), such blocks may be assigned a default intra-mode. That is, for example, such blocks may be assigned plane intra-mode, which also may be referred to as planar intra-mode. Plane intra-mode may include a linear plane function that is fitted to the block for prediction purposes. Plane intra-mode may work (provide an accurate prediction) well in areas of smoothly-varying luminance.

In some instances, plane intra-mode may be relatively frequently selected as an intra-mode for coding video data. That is, there may be a relatively higher chance of selecting plane mode for coding a current block than other coding modes. Accordingly, setting the default mode to plane mode may increase the possibility of the video encoder being able to code a current mode based on the MPM when blocks are unavailable.

Figure 7:
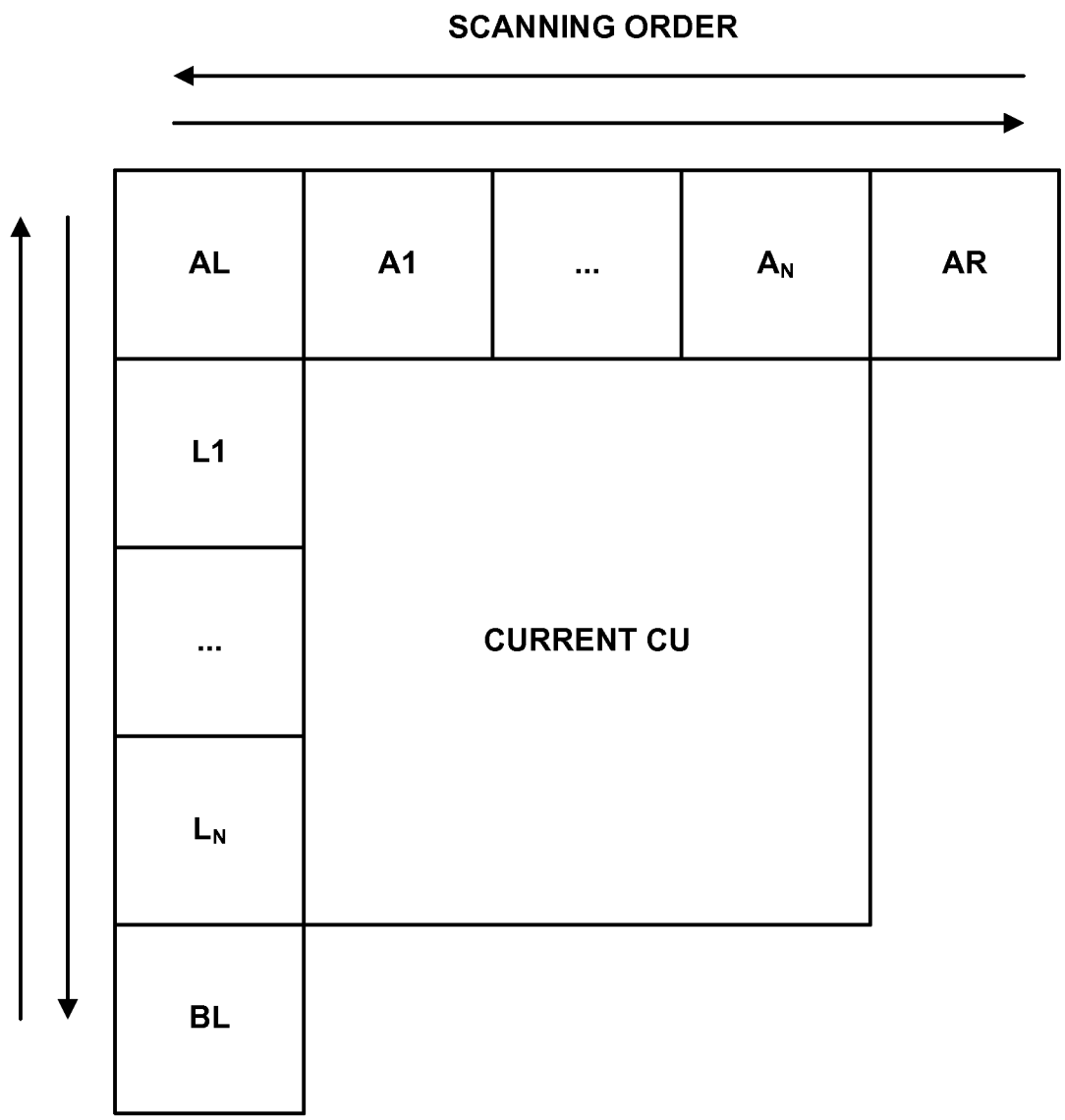
FIG. 7 is a block diagram illustrating most probable intra-mode candidates, according to aspects of this disclosure.

The techniques of this disclosure also relate to considering more than two MPMs. For example, as shown in the example of FIG. 7, a video coder may consider intra-modes associated with a plurality of neighboring blocks as MPMs. That is, the video coder may consider an intra-mode associated with any reference block that neighbors a block currently being coded as an MPM for the current block. The video coder may generate a list of MPMs, and assign index values to each MPM in the list. The video coder may then intra-code the current block based on the MPM, as described above.

In the example shown in FIG. 7, the video coder considers the intra-modes associated with each block that neighbors the current block, including an "above left" (AL) neighboring block, as well as a "first above" neighboring block (A1), "second above" neighboring block A2 (not shown), "nth above" neighboring block $A_N$, etc., to an "above right" (AR) neighboring block when determining an MPM. In addition, in the example shown in FIG. 7, the video coder may consider the intra-modes associated with the "first left" (L1) neighboring block, "second left" neighboring block L2 (not shown), "nth left" neighboring block $L_N$, etc., to a "below left" (BL) neighboring block.

According to some aspects of this disclosure, the video coder may only consider the reference blocks that are intra-coded when determining an MPM. In another example, the video coder may consider all blocks (e.g., including inter-coded blocks and/or otherwise unavailable blocks). In such an example, the video coder may assign a default intra-mode (e.g., such as planar mode or DC mode) to unavailable blocks before determining an MPM, as described above.

In some examples, the comparison order (e.g., the order in which the current intra-mode is compared to the intra-mode of the reference blocks) by an encoder or decoder may be from left to right, followed by top to bottom. For example, as illustrated in FIG. 7, the comparison order may proceed left to right in the direction from AL to AR followed from top to bottom in the direction from AL to BL. In another example, the comparison order may be from right to left, followed by bottom to top. For example, as also illustrated in FIG. 7, the comparison order may proceed from right to left in the direction from AR to AL followed by bottom to top in the direction from BL to AL. In other examples, any other combination of comparison orders (e.g., bottom to top followed by left to right, right to left followed by top to bottom, and the like) can be used.

In still other examples, the comparison order can be defined by a predetermined rule. In such examples, video encoder 20 may signal, and video decoder 30 may retrieve from an encoded bitstream, the rule regarding the comparison order. In still other examples, according to aspects of this disclosure, a video coder may consider a sub-set of neighboring blocks, such as every other block, every third block, or a different sub-set of blocks when comparing a current intra-mode to the intra-modes of neighboring blocks.

The reference blocks that are considered when determining an MPM can be fixed or signaled. That is, for example, video encoder 20 and video decoder 30 may both be configured to determine the MPM by comparing the intra-modes of the same neighboring reference blocks. In addition, video encoder 20 and the video decoder 30 may both be configured to determine the same comparison order (e.g., the order in which the current intra-mode is compared to the intra-modes of reference blocks).

Alternatively, video encoder 20 may signal which reference blocks to consider during MPM intra-coding, and/or the comparison order. In this example, video decoder 30 may perform the MPM coding based on the received signaling provided by video encoder 20.

According to aspects of this disclosure, the number of references blocks that are considered when identifying an MPM may be related to the number of different MPMs possible for selection. That is, for example, each reference block that is considered may be associated with a single MPM. The number of MPMs can be fixed, derived, or signaled. For example, an MPM may be dependent on a number of different factors such as neighboring blocks, slice type, block size, etc. This information may be used to determine the number of MPMs, for example, by a known formula. This known formula may then be used to derive the number of MPMs.

It should be understood that, while the reference blocks in the example of FIG. 7 are shown as being similar or the same in size, different size reference blocks may be considered by the video coder when identifying an MPM. Moreover, more or fewer candidates than those shown in the example of FIG. 7 may be considered.

Figure 8:
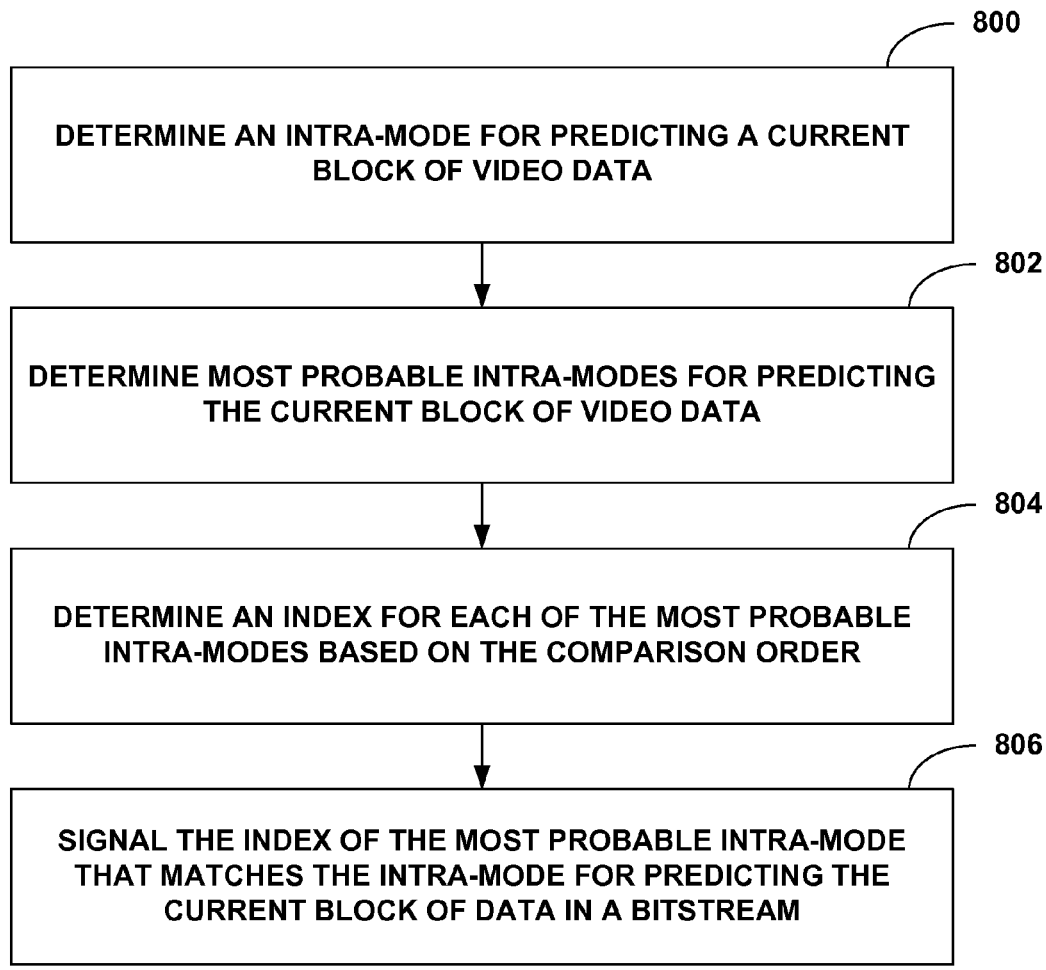
FIG. 8 is a flow chart illustrating an example method of encoding video data in accordance with one or more examples described in this disclosure.

FIG. 8 is a flow chart illustrating an example method of encoding video data in accordance with one or more examples described in this disclosure. In the example method of encoding video data of FIG. 8 video encoder 20 determines an intra-mode for predicting a current block of video data (800). For example, video encoder 20 may perform intra-coding of video blocks within video slices. Intra-coding may rely on spatial prediction to reduce or remove spatial redundancy in video within a given video frame or picture. An intra-mode may refer to any of several spatial compression modes.

Video encoder 20 determines candidate MPMs for predicting the current block of video data (802). That is, for example, video encoder 20 may identify an intra-prediction mode of previously encoded blocks (e.g., reference blocks) and compare such intra-prediction modes to an intra-prediction mode for the current block (e.g., an actual intra-mode for coding the current block as selected, for example, using a rate-distortion analysis described above with respect to FIG. 2). The intra-modes of such reference blocks may have a relatively high probability of being the same or similar to the current block due to a spatial proximity of the blocks to the current block. The intra-prediction mode of multiple reference blocks may be considered when identifying an MPM.

In some examples, video encoder 20 compares the intra-mode to each of the MPMs in a comparison order. As discussed above, the comparison order is, for example, the order in which the current intra-mode is compared to the intra-mode of the reference blocks by video encoder 20. The comparison order may be from left to right, followed by top to bottom. In another example, the comparison order may be from right to left, followed by bottom to top. In other examples, any other combination of comparison orders (e.g., bottom to top followed by left to right, right to left followed by top to bottom, and the like) can be used.

As discussed above, in still other examples, the comparison order can be defined by some rule, and the rule can be signaled (e.g., signaled by video encoder 20 to be used by video decoder 30). In still other examples, according to aspects of this disclosure, video encoder 20 may consider a sub-set of neighboring blocks, such as every other block, every third block, or a different sub-set of blocks when comparing a current intra-mode to the intra-modes of neighboring blocks.

Video encoder 20 determines an index for each of the MPMs based on the comparison order (804). For example, as discussed above with respect to FIG. 6, video encoder 20 may assign an index value of zero to the intra-mode of the left-neighboring block ("0" "FIRST COMPARISON") and an index value of one to the intra-mode of the above-neighboring block ("1" "SECOND COMPARISON"). While the example shown in FIG. 6 includes only two MPMs, additional index values may be assigned to other MPMs if such MPMs are considered.

Video encoder 20 signals the index of the MPM that matches the intra-mode for predicting the current block of data in a bitstream (806). For example, as noted above, the index may identify the matching MPM based on the comparison order. In contrast, each intra-mode may have an original associated intra-mode index that identifies the intra-mode as one of a plurality of possible intra-modes (such as one of 35 intra-modes), as defined according to a coding standard. This original index may be different from the index signaled in the bitstream according to the aspects of this disclosure. For example, as noted above, video encoder 20 may assign MPM index values based on a comparison order in ascending order, such an MPM compared to the current intra-mode relatively earlier in the comparison process may have a lower index value than an MPM compared to the current intra-mode relatively later in the comparison process. Accordingly, the earlier compared MPM may have a lower index value than the later compared MPM, regardless of the original intra-mode index of the earlier compared MPM. That is, in some examples, the earlier compared MPM may have a higher original index value than the later compared MPM.

Figure 9:
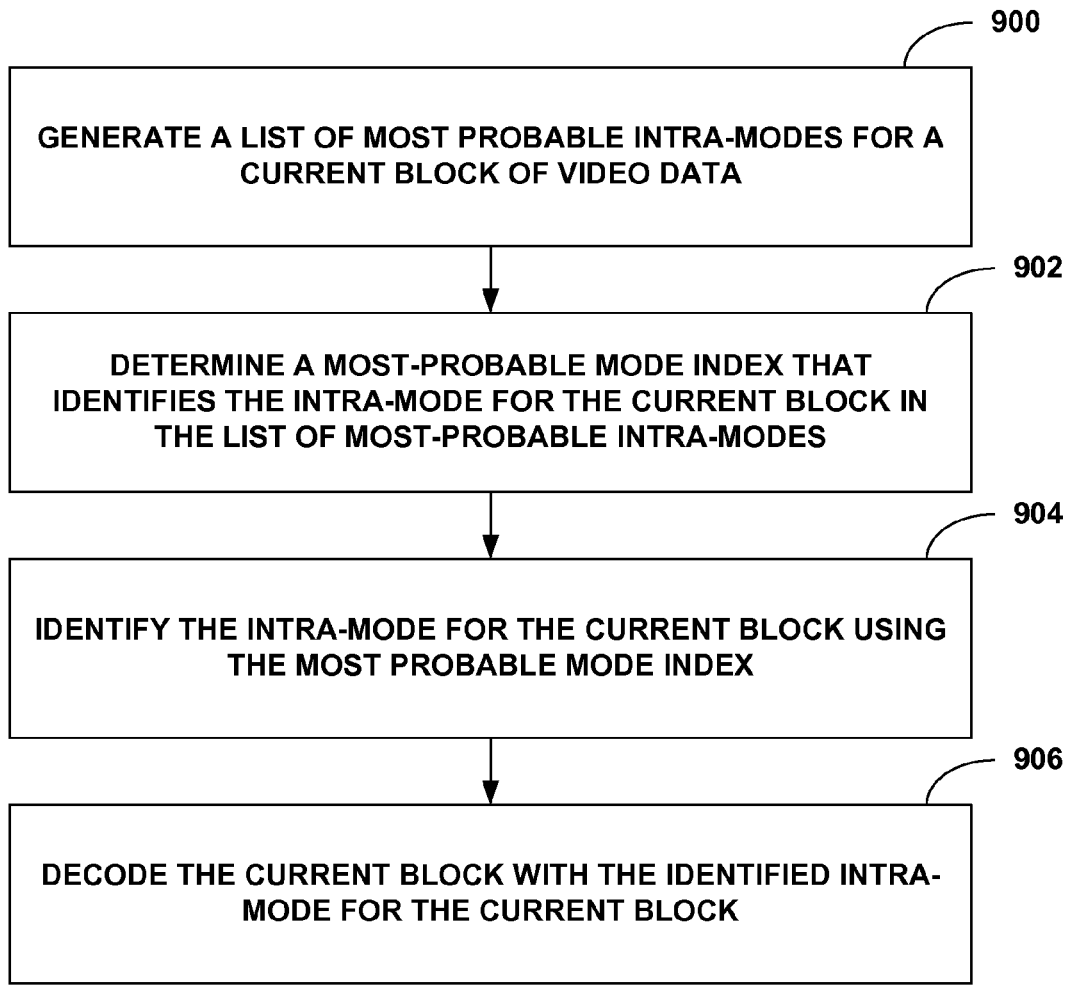
FIG. 9 is a flow chart illustrating an example method of decoding video data in accordance with one or more examples described in this disclosure.

FIG. 9 is a flow chart illustrating an example method of decoding video data in accordance with one or more examples described in this disclosure. In the example method of decoding video data of FIG. 9, video decoder 30 generates a list of MPMs for a current block of video data (900). For example, the video coder 30 may generate a list of MPMs, and assign index values to each MPM in the list. The list of MPMs may be arranged in a comparison order that is indicative of an order in which an intra-mode for a current block of video data was compared to one or more intra-modes associated with one or more reference blocks of video data during encoding of the current block of video data.

Video decoder 30 determines an MPM index that identifies the intra-mode for the current block in the list of MPMs (902). Video decoder 30 may determine an MPM index that identifies the intra-mode for the current block in the list of MPMs. Video decoder 30 may then identify the intra-mode for the current block using the MPM index, and decode the current block with the identified intra-mode for the current block. In one example, video decoder 30 may determine the MPM index based on signaling included in an encoded bitstream. Video encoder 20 may have signaled the intra-prediction mode using a one bit MPM flag. That is, video encoder 20 can signal that the intra-prediction mode for a current block is the same as the MPM, without having to explicitly identify the intra-prediction mode for the current block. Video decoder 30 may then receive the flag indicating that the intra-mode for the current block is the same as the MPM.

Video decoder 30 identifies the intra-mode for the current block using the MPM index (904). For example, video decoder 30 may identify the MPM using the same blocks considered by video encoder 20 during encoding. Video decoder 30 may then use the signaled MPM index to select one of the sorted intra-modes. The video decoder 30 decodes the current block with the identified intra-mode for the current block (906).

For example, as noted above, the index may identify the matching MPM based on the comparison order. In contrast, each intra-mode may have an original associated intra-mode index that identifies the intra-mode as one of a plurality of possible intra-modes (such as one of 35 intra-modes), as defined according to a coding standard. This original index may be different from the index signaled in the bitstream according to the aspects of this disclosure. For example, video decoder 30 may determine MPM index values based on a comparison order in ascending order.

Figure 10:
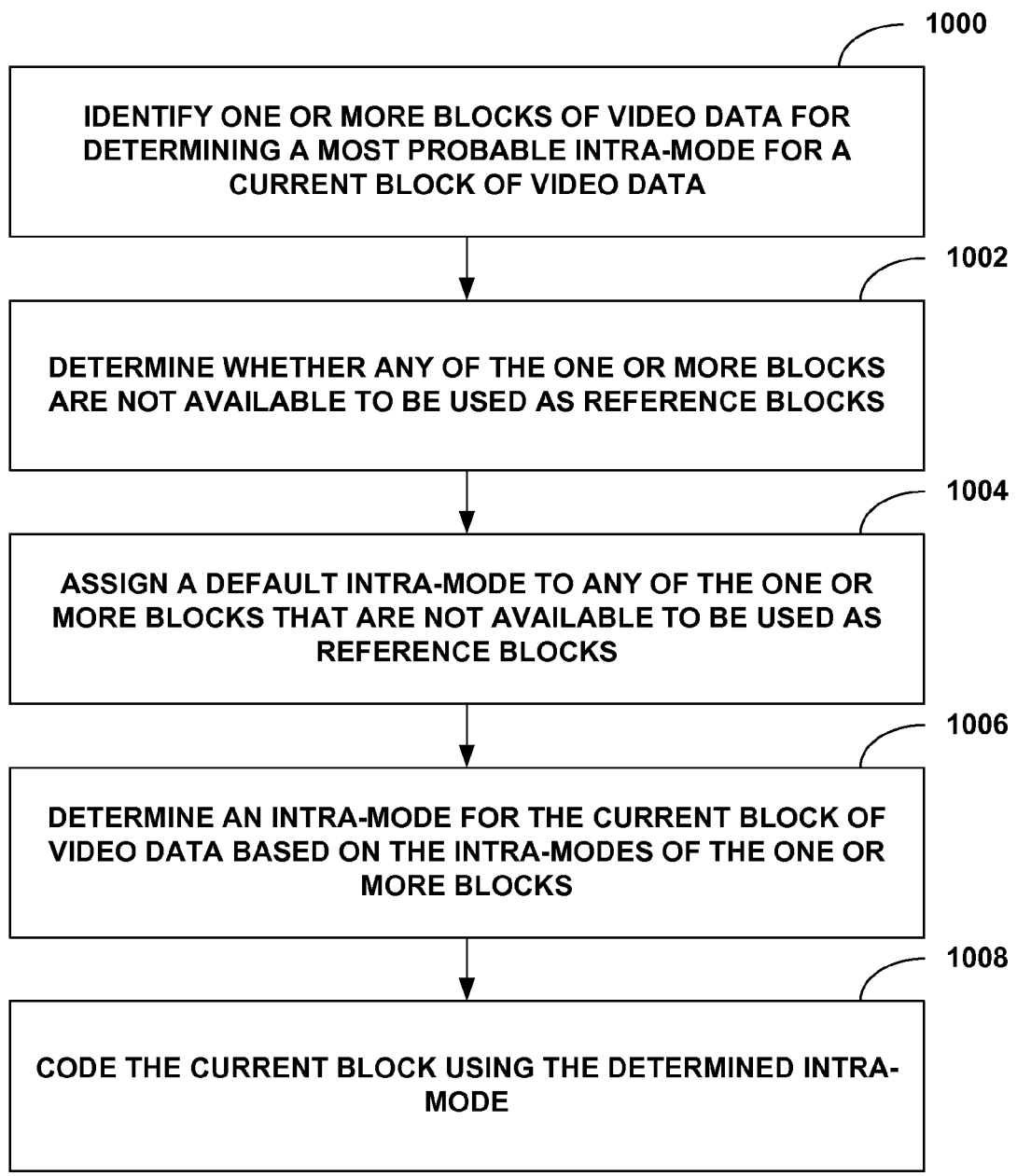
FIG. 10 is a flow chart illustrating an example method of coding video data in accordance with one or more examples described in this disclosure.

FIG. 10 is a flow chart illustrating an example method of coding video data in accordance with one or more examples described in this disclosure. In the example method of coding video data of FIG. 10 a video coder such as video encoder 20 or video decoder 30 may identify one or more blocks of video data for determining an MPM for a current block of video data (1000). The video coder may determine whether any of the one or more blocks are not available to be used as reference blocks for determining an MPM for the current block of video data (1002). For example, a reference block may be considered "unavailable" if the reference block has not yet been coded (and thus its prediction mode is unknown), if the reference block is coded using inter-prediction (described above), or if the reference block does not exist (the block positioned in the upper left corner of a picture or slice may not have neighboring blocks to the left and/or above).

The video coder assigns a default intra-mode to any of the one or more blocks that are not available to be used as reference blocks. In one example, the default intra-mode may be planar mode (1004). Planar intra-mode (also referred to as plane intra-mode) may include a linear plane function that is fitted to the block for prediction purposes and may provide an accurate prediction in areas of smoothly-varying luminance. In other examples, the default intra-mode may be DC mode or another intra-mode.

The video coder determines an intra-mode for the current block of video data based on the intra-modes of the one or more blocks (1006). For example, with respect to video encoder 20, as described with respect to the example of FIG. 4 above, if the actual intra-mode for the current block (e.g., as calculated, for example, by intra-prediction unit 46) is the same as either reference block A or reference block B, video encoder 20 may signal a one-bit flag indicating that an MPM is used to encode the current block (e.g., MPM flag is set equal to one). Alternatively, with respect to video decoder 30, as described above, video decoder 30 may obtain an MPM flag from an encoded bitstream, and use the MPM flag to determine the intra-mode for decoding the current block.

The video coder codes the current block using the determined intra-mode (1008). For example, video encoder 20 encodes the current block by predicting the current block using the determined intra-mode to generate a reference video block. The video encoder 20 may also determine a residual block including a difference between the reference block and the current block and include the residual block in the bitstream. Alternatively, video decoder 30 decodes the current block with the identified MPM for the current block. For example, the video decoder 30 may obtain, from an encoded bitstream, a residual video block associated with the current block. The video decoder 30 may generate a reference block by predicting the current block using the identified intra-mode for the current block. Additionally, the video decoder 30 may determine values for the current block from a combination of the reference block and a received residual video block.

While certain aspects of this disclosure have been described with respect to video encoder 20 and video decoder 30, it should be understood that the techniques of this disclosure may be applied by a number of other video encoding and/or decoding units, processors, processing units, hardware-based coding units such as encoder/decoders (CODECs), and the like. Moreover, it should be understood that the steps shown and described with respect to FIGS. 8-10 are provided as merely examples. That is, steps shown in the examples of FIGS. 8-10 need not necessarily be performed in the order shown in FIGS. 8-10, and fewer, additional, or alternative steps may be performed.

Moreover, it should be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of intraoperative hardware units, including one or more processors as described above, in conjunction with suitable software and/or firmware.

Various aspects of the disclosure have been described. These and other aspects are within the scope of the following claims.

What is claimed is:

1. A method of encoding video data, the method comprising:
   determining an intra-mode for predicting a current block of video data;
   determining most probable modes (MPMs) for predicting the current block of video data wherein the MPMs are intra-modes associated with respective neighboring blocks of video data encoded prior to the current block;
   generating a list of the MPMs based on a position of the respective neighboring blocks of video data associated with the MPMs;
   assigning an index to each of the MPMs in the list without resorting the MPMs in the list based on a mode index of the MPMs;
   and
   encoding intra-mode data of the current block, comprising encoding, when one of the MPMs matches the intra-mode for predicting the current block, data that represents the index of the matching MPM in the list in an encoded bitstream.

2. The method of claim 1, wherein encoding the intra-mode data of the current block comprises, when one of the MPMs does not match the intra-mode for predicting the current block:
   encoding an MPM flag that indicates that the intra-mode for predicting the current block is not an MPM;
   generating a modified list of intra-modes; and
   encoding data that represents an index of the intra-mode of the current block in the modified list.

3. The method of claim 2, wherein generating the modified list comprises eliminating the MPMs from the modified list of intra-modes.

4. The method of claim 2, wherein generating the modified list comprises sorting the modified list of intra-modes in ascending order according to a mode value of the intra-modes.

5. The method of claim 1, further comprising encoding, prior to the index of the matching MPM, an MPM flag that indicates that the data that represents the index of the matching MPM is present in the encoded bitstream.

6. The method of claim 1, wherein determining the MPMs comprises determining intra-modes associated with a left-neighboring video block of the current block and an above-neighboring video block of the current block, and wherein generating the list of the MPMs comprises assigning an index to the intra-mode associated with the left-neighboring video block that is less than an index of the intra-mode associated with the above-neighboring block.

7. The method of claim 1, wherein determining the MPMs comprises determining intra-modes associated with a left-neighboring video block of the current block and an above-neighboring video block of the current block, and wherein generating the list of the MPMs comprises assigning an index to the intra-mode associated with the above-neighboring block that is less than an index of the intra-mode associated with an intra-mode associated with the left-neighboring video block.

8. The method of claim 1, wherein assigning an index to each of the MPMs comprises assigning indices to intra-modes of neighboring blocks of the current block based on an order in which the neighboring blocks are encoded.

9. The method of claim 1, wherein assigning an index to each of the MPMs comprises assigning indices to the MPMs based on statistics associated with a likelihood of an MPM matching the intra-mode for predicting the current block.

10. The method of claim 1, further comprising encoding data that represents an order in which indices are assigned to the MPMs.

11. The method of claim 1, wherein the MPMs comprise more than two MPMs associated with more than two reference blocks.

12. The method of claim 1, wherein determining MPMs for predicting the current block of video data further comprises:
   identifying one or more blocks that cannot be used for reference during intra-coding; and
   assigning the one or more blocks a default intra-mode.

13. The method of claim 12, wherein the default mode is planar intra-mode.

14. The method of claim 12, wherein the default mode is DC intra-mode.

15. An apparatus for encoding video data, the apparatus comprising;
   a memory configured to store a current block of video data and
   one or more processors configured to:
      determine an intra-mode for predicting the current block of video data;
      determine most probable modes (MPMs) for predicting the current block of video data, wherein the MPMs are intra-modes associated with respective neighboring blocks of video data encoded prior to the current block;
      generate a list of the MPMs based on a position of the respective neighboring blocks of video data associated with the MPMs;

assign an index to each of the MPMs in the list without resorting the MPMs in the list based on a mode index of the MPMs;

encode intra-mode data of the current block, comprising encoding, when one of the MPMs matches the intra-mode for predicting the current block, data that represents the index of the matching MPM in the list in an encoded bitstream.

16. The apparatus of claim 15, wherein to encode the intra-mode data of the current block, when one of the MPMs does not match the intra-mode for predicting the current block, the one or more processors further configured to:

encode an MPM flag that indicates that the intra-mode for predicting the current block is not an MPM;

generate a modified list of intra-modes; and encode data that represents an index of the intra-mode of the current block in the modified list.

17. The apparatus of claim 16, wherein to generate the modified list, the one or more processors are configured to eliminate the MPMs from the modified list of intra-modes.

18. The apparatus of claim 16, wherein to generate the modified list, the one or more processors are configured to sort the modified list of intra-modes in ascending order according to a mode value of the intra-modes.

19. The apparatus of claim 15, the one or more processors further configured to encode, prior to the index of the matching MPM, an MPM flag that indicates that the data that represents the index of the matching MPM is present in the encoded bitstream.

20. The apparatus of claim 15, wherein to determine the MPMs, the one or more processors are configured to determine intra-modes associated with a left-neighboring video block of the current block and an above-neighboring video block of the current block, and wherein to assign an index to each of the MPMs, the one or more processors are configured to assign an index to the intra-mode associated with the left-neighboring video block that is less than an index of the intra-mode associated with the above-neighboring block.

21. The apparatus of claim 15, wherein to determine the MPMs, the one or more processors are configured to determine intra-modes associated with a left-neighboring video block of the current block and an above-neighboring video block of the current block, and wherein to assign an index to each of the MPMs, the one or more processors are configured to assign an index to the intra-mode associated with the above-neighboring video block that is less than an index of the intra-mode associated with the left-neighboring block.

22. The apparatus of claim 15, wherein to assign an index to each of the MPMs, the one or more processors are configured to assign indices to intra-modes of neighboring blocks of the current block based on an order in which the neighboring blocks are encoded.

23. The apparatus of claim 15, wherein, to assign an index to each of the MPMs, the one or more processors are configured to assign indices to the MPMs based on statistics associated with a likelihood of an MPM matching the intra-mode for predicting the current block.

24. The apparatus of claim 15, wherein the one or more processors are further configured to encode data that represents an order in which indices are assigned to the MPMs.

25. The apparatus of claim 15, wherein the MPMs comprise more than two MPMs associated with more than two reference blocks.

26. The apparatus of claim 15, wherein to determine MPMs for predicting the current block of video data, the one or more processors are further configured to:

identify one or more blocks that cannot be used for reference during intra-coding; and assign the one or more blocks a default intra-mode.

27. The apparatus of claim 26, wherein the default intra-mode is planar mode.

28. The apparatus of claim 26, wherein the default mode is DC intra-mode.

29. The apparatus of claim 15, further comprising a camera configured to capture the current block, wherein the apparatus comprises a video encoder, and wherein the one or more processors are further configured to:

predict the current block using the determined intra-mode to generate a reference video block;

determine a residual block comprising a difference between the reference block and the current block; and encode data that represents the residual block in the encoded bitstream.

30. A non-transitory computer-readable storage medium having stored thereon instructions that, when executed, cause one or more processors to:

determine an intra-mode for predicting a current block of video data;

determine most probable modes (MPMs) for predicting the current block of video data, wherein the MPMs are intra-modes associated with respective neighboring blocks of video data encoded prior to the current block;

generate a list of the MPMs based on a position of the respective neighboring blocks of video data associated with the MPMs;

assign an index to each of the MPMs in the list without resorting the MPMs in the list based on a mode index of the MPMs;

and encode intra-mode data of the current block, comprising encoding, when one of the MPMs matches the intra-mode for predicting the current block, data that represents the index of the matching MPM in the list in an encoded bitstream.

31. The non-transitory computer-readable storage medium of claim 30, wherein to encode the intra-mode data of the current block, when one of the MPMs does not match the intra-mode for predicting the current block, the instructions cause the one or more processors to:

encode an MPM flag that indicates that the intra-mode for predicting the current block is not an MPM;

generate a modified list of intra-modes; and encode data that represents an index of the intra-mode of the current block in the modified list.

32. The non-transitory computer-readable storage medium of claim 31, wherein to generate the modified list, the instructions cause the one or more processors to eliminate the MPMs from the modified list of intra-modes.

33. The non-transitory computer-readable storage medium of claim 31, wherein to generate the modified list, the instructions cause the one or more processors to sort the modified list of intra-modes in ascending order according to a mode value of the intra-modes.

34. The non-transitory computer-readable storage medium of claim 30, further comprising instructions that, when executed, cause the one or more processors to encode, prior to the index of the matching MPM, an MPM flag that indicates that the data that represents the index of the matching MPM is present in the encoded bitstream.

35. The non-transitory computer-readable storage medium of claim 30, wherein, to determine the MPMs, the instructions cause the one or more processors to determine intra-modes associated with a left-neighboring video block of the current block and an above-neighboring video block of the current block, and wherein to assign an index to each of the MPMs, the instructions cause the one or more processors to assign an index to the intra-mode associated with the left-neighboring block that is less than an index of the intra-mode associated with the above-neighboring video block.

36. The non-transitory computer-readable storage medium of claim 30, wherein, to determine the MPMs, the instructions cause the one or more processors to determine intra-modes associated with a left-neighboring video block of the current block and an above-neighboring video block of the current block, and wherein to assign an index to each of the MPMs, the instructions cause the one or more processors to assign an index to the intra-mode associated with the above-neighboring block that is less than an index of the intra-mode associated with the left-neighboring video block.

37. An apparatus for encoding video data, the apparatus comprising:
    means for determining an intra-mode for predicting a current block of video data;
    means for determining most probable modes (MPMs) for predicting the current block of video data, wherein the MPMs are intra-modes associated with respective neighboring blocks of video data encoded prior to the current block;
    means for generating a list of the MPMs based on a position of the respective neighboring blocks of video data associated with the MPMs;
    means for assigning an index to each of the MPMs in the list without resorting the MPMs in the list based on a mode index of the MPMs; and
    means for encoding, when one of the MPMs matches the intra-mode for predicting the current block, data that represents the index of the matching MPM in the list in an encoded bitstream.

38. A method of decoding video data, the method comprising:
    determining most probable modes (MPMs) for predicting a current block of video data, wherein the MPMs are intra-modes associated with respective neighboring blocks of video data decoded prior to the current block;
    generating a list of the determined MPMs for predicting the current block of video data based on a position of the respective neighboring blocks of video data associated with the MPMs;
    assigning an index to each of the MPMs in the list without resorting the MPMs in the list based on a mode index of the MPMs;
    decoding intra-mode data of the current block, comprising decoding, when one of the MPMs matches an intra-mode for the current block, data that represents the index of the matching MPM in the list from an encoded bitstream;
    identifying the intra-mode for predicting the current block using the index; and
    decoding the current block with the identified intra-mode for the current block.

39. The method of claim 38, wherein, decoding the intra-mode data of the current block comprises, when one of the MPMs does not match the intra-mode for predicting the current block:
    decoding an MPM flag that indicates that the intra-mode for predicting the current block is not an MPM;
    generating a modified list of intra-modes; and
    decoding data that represents an index of the intra-mode of the current block in the modified list.

40. The method of claim 39, wherein generating the modified list comprises eliminating the MPMs from the modified list of intra-modes.

41. The method of claim 39, wherein generating the modified list comprises sorting the modified list of intra-modes in ascending order according to a mode value of the intra-modes.

42. The method of claim 38, wherein determining the MPMs comprises determining intra-modes associated with a left-neighboring video block of the current block and an above-neighboring video block of the current block, and wherein assigning an index to each of the MPMs comprises assigning an index to the an intra-mode associated with the left-neighboring video block that is less than an index of the an intra-mode associated with the above-neighboring video block.

43. The method of claim 38, wherein determining the MPMs comprises determining intra-modes associated with a left-neighboring video block of the current block and an above-neighboring video block of the current block, and wherein assigning an index to each of the MPMs comprises assigning an index to the intra-mode associated with the above-neighboring video block that is less than an index of one of the intra-modes associated with the left-neighboring video block.

44. The method of claim 38, wherein assigning an index to each of the MPMs comprises assigning indices to intra-modes of neighboring blocks of the current block based on an order in which the neighboring blocks are decoded.

45. The method of claim 38, wherein assigning an index to each of the MPMs comprises assigning indices to the MPMs based on statistics associated with a likelihood of an MPM matching the intra-mode for predicting the current block.

46. The method of claim 37, further comprising decoding data that represents an order in which indices are assigned to the MPMs.

47. An apparatus for decoding video data, the apparatus comprising:
    a memory configured to store a current block of video data; and
    one or more processors configured to:
        determine most probable modes (MPMs) for predicting the current block of video data, wherein the MPMs are intra-modes associated with respective neighboring blocks of video data decoded prior to the current block;
        generate a list of the determined MPMs for predicting the current block of video data based on a position of the respective neighboring blocks of video data associated with the MPMs;
        assign an index to each of the MPMs in the list without resorting the MPMs in the list based on a mode index of the MPMs;
        decode intra-mode data of the current block, comprising decoding, when one of the MPMs matches an intra-mode for the current block, data that represents the index of the matching MPM in the list from an encoded bitstream;
        identify the intra-mode for predicting the current block using the index; and
        decode the current block with the identified intra-mode for the current block.

48. The apparatus of claim 47, wherein to decode the intra-mode data, the one or more processors are further configured to, when one of the MPMs does not match the intra-mode for predicting the current block:

decode an MPM flag that indicates that the intra-mode for predicting the current block is not an MPM;
generate a modified list of intra-modes; and
decode data that represents an index of the intra-mode of the current block in the modified list.

49. The apparatus of claim 48, wherein to generate the modified list, the one or more processors are configured to eliminate the MPMs from the modified list of intra-modes.

50. The apparatus of claim 48, wherein to generate the modified list, the one or more processors are configured to sort the modified list of intra-modes in ascending order according to a mode value of the intra-modes.

51. The apparatus of claim 47, wherein to determine the MPMs, the one or more processors are configured to determine intra-modes associated with a left-neighboring video block of the current block and an above-neighboring video block of the current block, and wherein to assign an index to each of the MPMs, the one or more processors are configured to assign an index to the intra-mode associated with the left-neighboring video block that is less than an index of an intra-mode associated with the above-neighboring.

52. The apparatus of claim 47, wherein to determine the MPMs, the one or more processors are configured to determine intra-modes associated with a left-neighboring video block of the current block and an above-neighboring video block of the current block, and wherein to assign an index to each of the MPMs, the one or more processors are configured to assign an index to the intra-mode associated with the above-neighboring video block that is less than an index of an intra-mode associated with the left-neighboring.

53. The apparatus of claim 47, wherein to assign an index to each of the MPMs, the one or more processors are configured to assign indices to intra-modes of neighboring blocks of the current block based on an order in which the neighboring blocks are decoded.

54. The apparatus of claim 47, wherein to assign an index to each of the MPMs, the one or more processors are configured to assign indices to the MPMs based on statistics associated with a likelihood of an MPM matching the intra-mode for predicting the current block.

55. The apparatus of claim 47, wherein the one or more processors are further configured to decode data that represents an order in which indices are assigned to the MPMs.

56. The apparatus of claim 47, wherein the apparatus comprises a video decoder, and wherein to decode the current block, the one or more processors further configured to:
obtain, from the encoded bitstream, a residual video block associated with the current block;
generate a reference block by predicting the current block using the identified intra-mode for the current block;
determine values for the current block from a combination of the reference block and a received residual video block; and
wherein the apparatus further comprises a display configured to display the current block.

57. A non-transitory computer-readable storage medium having stored thereon instructions that, when executed, cause one or more processors to:
determine most probable modes (MPMs) for predicting a current block of video data, wherein the MPMs are intra-modes associated with respective neighboring blocks of video data decoded prior to the current block;
generate a list of the determined MPMs for predicting the current block of video data based on a position of the respective neighboring blocks of video data associated with the MPMs;
assign an index to each of the MPMs without resorting the MPMs in the list based on a mode index of the MPMs;
decode intra-mode data of the current block, comprising decoding, when one of the MPMs matches an intra-mode for the current block, data that represents the index of the matching MPM in the list from an encoded bitstream;
identify the intra-mode for predicting the current block using the index; and
decode the current block with the identified intra-mode for the current block.

58. The computer-readable storage medium of claim 57, wherein to decode the intra-mode data of the current block, when one of the MPMs does not match the intra-mode for predicting the current block, the instructions further cause the one or more processors to:
decode an MPM flag that indicates that the intra-mode for predicting the current block is not an MPM;
generate a modified list of intra-modes; and
decode data that represents an index of the intra-mode of the current block in the modified list.

59. The computer-readable storage medium of claim 57, wherein to determine the MPMs, the instructions cause the one or more processors to determine intra-modes associated with a left-neighboring video block of the current block and an above-neighboring video block of the current block, and wherein to assign an index to each of the MPMs, the instructions cause the one or more processors to intra-mode associated with the above-neighboring video block that is less than an index of the an intra-mode associated with the left-neighboring.

60. The computer-readable storage medium of claim 57, wherein to determine the MPMs, the instructions cause the one or more processors to determine intra-modes associated with a left-neighboring video block of the current block and an above-neighboring video block of the current block, and wherein to assign an index to each of the MPMs, the instructions cause the one or more processors to intra-mode associated with the left-neighboring video block that is less than an index of the an intra-mode associated with the above-neighboring.

61. An apparatus for decoding video data, the apparatus comprising:
means for determining most probable modes (MPMs) for predicting a current block of video data, wherein the MPMs are intra-modes associated with respective neighboring blocks of video data decoded prior to the current block;
means for generating a list of the determined MPMs for predicting the current block of video data based on a position of the respective neighboring blocks of video data associated with the MPMs;
means for assigning an index to each of the MPMs in the list without resorting the MPMs in the list based on a mode index of the MPMs;
means for decoding, when one of the MPMs matches an intra-mode for the current block, intra-mode data of the current block, comprising decoding data that represents the index of the matching MPM in the list from an encoded bitstream;
means for identifying the intra-mode for predicting the current block using the index; and
means for decoding the current block with the identified intra-mode for the current block.

* * * * *